United States Patent
McDonald

(10) Patent No.: US 7,144,969 B2
(45) Date of Patent: *Dec. 5, 2006

(54) IMPACT RESISTANT POLYUREAURETHANE AND POLYUREAURETHANE PREPOLYMER HAVING LOW NCO/OH RATIO

(75) Inventor: William H. McDonald, Cranberry Township, Butler County, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/287,715

(22) Filed: Nov. 5, 2002

(65) Prior Publication Data

US 2003/0105265 A1    Jun. 5, 2003

Related U.S. Application Data

(60) Provisional application No. 60/332,828, filed on Nov. 16, 2001.

(51) Int. Cl.
C08G 18/10 (2006.01)

(52) U.S. Cl. .......................................... 528/63; 528/64
(58) Field of Classification Search ................ 528/63, 528/64

See application file for complete search history.

(56) References Cited

U.S. PATENT DOCUMENTS

| | | | |
|---|---|---|---|
| 2,644,007 A | 6/1953 | Irwin | 260/453 |
| 2,680,127 A | 6/1954 | Slocombe et al. | 260/453 |
| 2,908,703 A | 10/1959 | Latourette et al. | 260/453 |
| 3,361,706 A | 1/1968 | Meriwether et al. | 260/39 |
| 3,562,172 A | 2/1971 | Ono et al. | 252/300 |
| 3,567,605 A | 3/1971 | Becker | 204/158 |
| 3,578,602 A | 5/1971 | Ono et al. | 252/300 |
| 4,160,853 A | 7/1979 | Ammons | 428/425 |
| 4,166,043 A | 8/1979 | Uhlmann et al. | 252/300 |
| 4,208,507 A * | 6/1980 | Stutz et al. | |
| 4,215,010 A | 7/1980 | Hovey et al. | 252/300 |
| 4,342,668 A | 8/1982 | Hovey et al. | 252/586 |
| 4,367,170 A | 1/1983 | Uhlmann et al. | 252/586 |
| 4,637,698 A | 1/1987 | Kwak et al. | 351/163 |
| 4,731,264 A | 3/1988 | Lin et al. | 427/387 |
| 4,756,973 A | 7/1988 | Sakagami et al. | 428/412 |
| 4,816,584 A | 3/1989 | Kwak et al. | 544/71 |
| 4,818,096 A | 4/1989 | Heller et al. | 351/163 |
| 4,826,977 A | 5/1989 | Heller et al. | 544/70 |
| 4,880,667 A | 11/1989 | Welch | 427/160 |
| 4,892,920 A * | 1/1990 | Quay et al. | |
| 4,931,219 A | 6/1990 | Kwiatkowski et al. | 252/586 |
| 4,931,220 A | 6/1990 | Haynes et al. | 252/586 |
| 5,066,818 A | 11/1991 | Gemert et al. | 549/389 |
| 5,134,191 A | 7/1992 | Takarada et al. | 524/783 |
| 5,231,156 A | 7/1993 | Lin | 526/279 |
| 5,238,931 A | 8/1993 | Yoshikawa et al. | 514/184 |
| 5,274,132 A | 12/1993 | Van Gemert | 549/389 |
| 5,384,077 A | 1/1995 | Knowles | 252/586 |
| 5,405,958 A | 4/1995 | Van Gemert | 544/71 |
| 5,429,774 A | 7/1995 | Kumar | 252/586 |
| 5,462,806 A | 10/1995 | Konishi et al. | 428/451 |
| 5,466,398 A | 11/1995 | Van Gemert et al. | 252/586 |
| 5,693,738 A | 12/1997 | Okazaki et al. | 528/51 |
| 5,811,506 A * | 9/1998 | Slagel | |
| 5,962,617 A | 10/1999 | Slagel | 528/61 |
| 6,127,505 A * | 10/2000 | Slagel | 528/61 |
| 6,174,984 B1 * | 1/2001 | Peter | |
| 6,175,450 B1 | 1/2001 | Andreani et al. | 359/586 |
| 6,187,444 B1 | 2/2001 | Bowles, III et al. | 428/423.1 |

OTHER PUBLICATIONS

Ullmann's Encyclopedia of Industrial Chemistry, 5th, 1992, vol. A21, pp. 673 to 674.
Z87.1-200X, Sep. 12, 2002, Committee Ballot Draft Revision of ANSI Z 87.1-1989 (R1998), Sections 7.5.2.1 "High Velocity Impact" and 14.3 "Test for High Impact Prescription Lenses".

* cited by examiner

*Primary Examiner*—Rachel Gorr
(74) *Attorney, Agent, or Firm*—Deborah M. Altman; Carol A. Marmo

(57) ABSTRACT

The present invention relates to a polyureaurethane wherein the prepolymer comprising said polyureaurethane has a NCO to OH equivalent ratio of from 2.0 to less than 2.5. In an embodiment, the polyureaurethane prepolymer comprises a polyisocyanate and at least one OH-containing material, which can be reacted with an amine-containing curing agent to produce the polyureaurethane of the present invention.

34 Claims, No Drawings

IMPACT RESISTANT POLYUREAURETHANE AND POLYUREAURETHANE PREPOLYMER HAVING LOW NCO/OH RATIO

This application is a conversion of United States Provisional Patent Application having Ser. No. 60/332,828, filed Nov. 16, 2001.

The present invention relates to a polyureaurethane wherein the prepolymer comprising said polyureaurethane has a NCO to OH equivalent ratio of from 2.0 to less than 2.5.

In general, an optically transparent plastic material is characterized by its impact resistance, and the temperature and pressure at which the material undergoes distortion.

There is a need for a polyureaurethane having a high impact resistance.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The present invention includes a polyureaurethane comprising the reaction product of:
  a. a polyureaurethane prepolymer comprising a polyisocyanate and at least one OH-containing material, said prepolymer having a NCO/OH equivalent ratio of from 2.0 to less than 2.5; and
  b. an amine-containing curing agent.

Further, the present invention includes a method of preparing a polyureaurethane comprising the steps of:
  a. reacting a polyisocyanate with at least one OH-containing material to form a polyureaurethane prepolymer having a NCO/OH equivalent ratio of from 2.0 to less than 2.5; and
  b. reacting said polyureaurethane prepolymer with an amine-containing curing agent to form said polyureaurethane.

In non-limiting embodiments, the polyureaurethane of the present invention can be used for transparency applications such as architectural glazings, vehicle glazings, riot shields, aircraft canopies, face masks, visors, opthalmic and sun lenses, protective eyewear, and transparent armor. It has been found that the polyureaurethane of the present invention can demonstrate at least one of the following characteristics: optical clarity, good ballistic properties, good chemical resistance, and acceptable heat distortion temperatures.

Polyisocyanates useful in the preparation of the polyureaurethane of the present invention are numerous and widely varied. Non-limiting examples can include but are not limited to aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring, and mixtures thereof. In a non-limiting embodiment, when an aromatic polyisocyanate is used, generally care should be taken to select a material that does not cause the polyureaurethane to color (e.g., yellow).

In alternate non-limiting embodiments, the polyisocyanate can include but is not limited to aliphatic or cycloaliphatic diisocyanates, aromatic diisocyanates, cyclic dimers and cyclic trimers thereof, and mixtures thereof. Non-limiting examples of suitable polyisocyanates can include but are not limited to Desmodur N 3300 (hexamethylene diisocyanate trimer) which is commercially available from Bayer; Desmodur N 3400 (60% hexamethylene diisocyanate dimer and 40% hexamethylene diisocyanate trimer). In a non-limiting embodiment, the polyisocyanate can include dicyclohexylmethane diisocyanate and isomeric mixtures thereof. As used herein and the claims, the term "isomeric mixtures" refers to a mixture of the cis-cis, trans-trans, and/or cis-trans isomers of the polyisocyanate. Non-limiting examples of isomeric mixtures for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

Suitable isomers for use in the present invention include but are not limited to the following three isomers of 4,4'-methylenebis(cyclohexyl isocyanate).

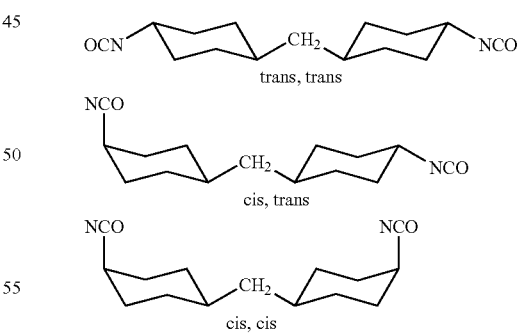

In one non-limiting embodiment, the PICM used in this invention can be prepared by phosgenating 4,4'-methylenebis(cyclohexyl amine) (PACM) by procedures well known in the art such as the procedures disclosed in U.S. Pat. Nos. 2,644,007; 2,680,127 and 2,908,703; which are incorporated herein by reference. The PACM isomer mixtures, upon phosgenation, can produce PICM in a liquid phase, a partially liquid phase, or a solid phase at room temperature. In alternate non-limiting embodiments, the PACM isomer mixtures can be obtained by the hydrogenation of methylenedianiline and/or by fractional crystallization of PACM isomer mixtures in the presence of water and alcohols such as methanol and ethanol.

Additional aliphatic and cycloaliphatic diisocyanates that can be used in alternate non-limiting embodiments of the present invention include 3-isocyanato-methyl-3,5,5-trimethyl cyclohexyl-isocyanate ("IPDI") which is commercially available from Arco Chemical, and meta-tetramethylxylene diisocyanate (1,3-bis(1-isocyanato-1-methylethyl)-benzene) which is commercially available from Cytec Industries Inc. under the tradename TMXDI.RTM. (Meta) Aliphatic Isocyanate.

As used herein and the claims, the term "aliphatic and cycloaliphatic diisocyanates" refers to 6 to 100 carbon atoms linked in a straight chain or cyclized having two diisocyanate reactive end groups. In a non-limiting embodiment of the present invention, the aliphatic and cycloaliphatic diisocyanates for use in the present invention can include TMXDI and compounds of the formula R—(NCO)$_2$ wherein R represents an aliphatic group or a cycloaliphatic group.

Suitable OH-containing materials for use in the present invention can include but are not limited to polyether polyols, polyester polyols, polycaprolactone polyols, polycarbonate polyols, and mixtures thereof.

Polyether polyols and methods for their preparation are known to those skilled in the art. Many polyether polyols of various types and molecular weight are commercially available from various manufacturers. Non-limiting examples of polyether polyols can include but are not limited to polyoxyalkylene polyols, and polyalkoxylated polyols. Polyoxyalkylene polyols can be prepared in accordance with known methods. In a non-limiting embodiment, a polyoxyalkylene polyol can be prepared by condensing an alkylene oxide, or a mixture of alkylene oxides, using acid- or base-catalyzed addition with a polyhydric initiator or a mixture of polyhydric initiators, such as but not limited to ethylene glycol, propylene glycol, glycerol, and sorbitol. Non-limiting examples of alkylene oxides can include ethylene oxide, propylene oxide, butylene oxide, amylene oxide, aralkylene oxides, such as but not limited to styrene oxide, mixtures of ethylene oxide and propylene oxide. In a further non-limiting embodiment, polyoxyalkylene polyols can be prepared with mixtures of alkylene oxide using random or step-wise oxyalkylation. Non-limiting examples of such polyoxyalkylene polyols include polyoxyethylene, such as but not limited to polyethylene glycol, polyoxypropylene, such as but not limited to polypropylene glycol.

In a non-limiting embodiment, polyalkoxylated polyols can be represent by the following general forumula I:

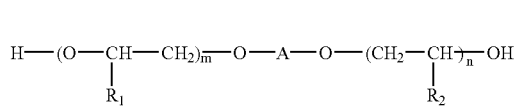

I wherein m and n can each be a positive integer, the sum of m and n being from 5 to 70; $R_1$ and $R_2$ can each be hydrogen, methyl or ethyl; and A can be a divalent linking group such as a straight or branched chain alkylene which can contain from 1 to 8 carbon atoms, phenylene, and $C_1$ to $C_9$ alkyl-substituted phenylene. The chosen values of m and n, in combination with the chosen divalent linking group, can determine the molecular weight of the polyol.

Polyalkoxylated polyols can be prepared by methods that are known in the art. In a non-limiting embodiment, a polyol such as 4,4'-isopropylidenediphenol can be reacted with an oxirane-containing material such as but not limited to ethylene oxide, propylene oxide and butylene oxide, to form what is commonly referred to as an ethoxylated, propoxylated or butoxylated polyol having hydroxy functionality. Non-limiting examples of polyols suitable for use in preparing polyalkoxylate polyols can include those polyols described in U.S. Pat. No. 6,187,444 B1 at column 10, lines 1–20, which disclosure is incorporated herein by reference.

As used herein and the claims, the term "polyether polyols" can include the generally known poly(oxytetramethylene) diols prepared by the polymerization of tetrahydrofuran in the presence of Lewis acid catalysts such as but not limited to boron trifluoride, tin (IV) chloride and sulfonyl chloride. Also included are the polyethers prepared by the copolymerization of cyclic ethers such as but not limited to ethylene oxide, propylene oxide, trimethylene oxide, and tetrahydrofuran with aliphatic diols such as but not limited to ethylene glycol, 1,3-butanediol, 1,4-butanediol, diethylene glycol, dipropylene glycol, 1,2-propylene glycol and 1,3-propylene glycol. Compatible mixtures of polyether polyols can also be used. As used herein, the term "compatible" means that the polyols are mutually soluble in each other so as to form a single phase.

Polycarbonate polyols are known in the art and are commercially available such as Ravecarb™ 107 (Enichem S.p.A.). In a non-limiting embodiment, the polycarbonate polyol can be produced by reacting an organic glycol such as a diol, such as those described hereinafter and in connection with the glycol component of the polyureaurethane, and a dialkyl carbonate, such as described in U.S. Pat. No. 4,160,853. In a non-limiting embodiment, the polyol can include polyhexamethyl carbonate such as H—(O—C(O)—O—(CH$_2$)$_6$)$_n$—OH, wherein n is an integer from 4 to 24, or from 4 to 10, or from 5 to 7.

In a non-limiting embodiment, the glycol material can comprise low molecular weight polyols such as polyols having a molecular weight of less than 500, and compatible mixtures thereof. As used herein, the term "compatible" means that the glycols are mutually soluble in each other so as to form a single phase. Non-limiting examples of these polyols can include but are not limited to low molecular weight diols and triols. In a further non-limiting embodiment, the amount of triol chosen is such as to avoid a high degree of cross-linking in the polyurethane. A high degree of cross-linking can result in a thermoset polyurethane that is not formable by moderate heat and pressure. The organic glycol typically contains from 2 to 16, or from 2 to 6, or from 2 to 10, carbon atoms. Non-limiting examples of such glycols can include but are not limited to ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl-1,3-pentanediol, 2-methyl-1,3-pentanediol, 1,3-2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, glycerin, tetramethylolmethane, such as but not limited to pentaerythritol, trimethylolethane and trimethylolpropane; and isomers thereof.

In alternate non-limiting embodiments, the OH-containing material can have a weight average molecular weight of at least 200, or at least 1000, or at least 2000. In alternate non-limiting embodiments, the OH-containing material can have a weight average molecular weight of less than 10000, or less than 15000, or less than 20000, or less than 32000.

In a non-limiting embodiment, suitable polyester glycols can include but are not limited to the esterification products of one or more dicarboxylic acids having from four to ten carbon atoms, such as adipic, succinic or sebacic acids, with one or more low molecular weight glycols having from two to ten carbon atoms, such as ethylene glycol, propylene glycol, diethylene glycol, 1,4-butanediol, neopentyl glycol, 1,6-hexanediol and 1,10-decanediol. In a non-limiting embodiment, the polyester glycols can be the esterification products of adipic acid with glycols of from two to ten carbon atoms.

Suitable polycaprolactone glycols for use in the present invention can include but are not limited to the reaction products of E-caprolactone with one or more of the low molecular weight glycols listed above. In a non-limiting embodiment, a polycaprolactone can be prepared by condensing caprolactone in the presence of a difunctional active hydrogen compound such as water or at least one of the low molecular weight glycols listed above.

In a non-limiting embodiment, the OH-containing material for use in the present invention can include teresters produced from at least one low molecular weight dicarboxylic acid, such as adipic acid.

In a non-limiting embodiment, polyester glycols and polycaprolactone glycols for use in the present invention can be prepared using known esterification or transesterification procedures as described, for example, in the article D. M. Young, F. Hostettler et al., "Polyesters from Lactone," Union Carbide F-40, p. 147.

In alternative non-limiting embodiments, polyester glycols can be prepared from the reaction of 1,6-hexanediol and adipic acid; 1,10-decandiol and adipic acid; or 1,10-decanediol and caprolactone.

Polyether glycols for use in the present invention can include but are not limited to polytetramethylene ether glycol.

In a non-limiting embodiment, the polyether-containing polyol can comprise block polymers including blocks of ethylene oxide-propylene oxide and/or ethylene oxide-butylene oxide. In a non-limiting embodiment, the polyether-containing polyol can comprise a block polymer of the following chemical formula:

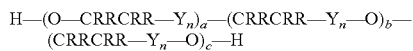

wherein R can represent hydrogen or $C_1$–$C_6$ alkyl; Y can represent $CH_2$; n can be an integer from 0 to 6; a, b, and c can each be an integer from 0 to 300, wherein a, b and c are chosen such that the weight average molecular weight of the polyol does not exceed 32,000.

In a further non-limiting embodiment, Pluronic R, Pluronic L62D, Tetronic R and Tetronic, which are commercially available from BASF, can be used as the polyether-containing polyol material in the present invention.

In alternate non-limiting embodiments, the OH-containing material for use in the present invention can be chosen from: (a) esterification product of adipic acid with at least one diol selected from 1,4-butanediol, 1,6-hexanediol, neopentyl glycol, or 1,10-decanediol; (b) reaction product of E-caprolactone with at least one diol selected from 1,4-butane diol, 1,6-hexane diol, neopentyl glycol, or 1,10-decanediol; (c) polytetramethylene glycol; (d) aliphatic polycarbonate glycols, and (e) mixtures thereof.

In the present invention, the equivalent ratio of NCO (i.e., isocyanate) to OH present in the polyureaurethane prepolymer can be an amount of from 2.0 to less than 2.5 NCO/1.0 OH.

Suitable amine-containing curing agents for use in the present invention are numerous and widely varied. Non-limiting examples include but are not limited to polyamines having more than one amino group per molecule, each amino group being independently selected from primary amino (—$NH_2$) and secondary amine (—NH—) groups. In alternate non-limiting embodiments, the amine-containing curing agent can be chosen from aliphatic polyamines, cycloaliphatic polyamines, aromatic polyamines, and mixtures thereof. In a further non-limiting embodiment, the amino groups are all primary groups. In an embodiment wherein it is desirable to produce a polyureaurethane having low color, the amine-curing agent can be chosen such that it has relatively low color and/or it can be manufactured and/or stored in a manner as to prevent the amine from developing a color (e.g., yellow).

Suitable amine-containing curing agents for use in the present invention can include but are not limited to materials having the following chemical formula:

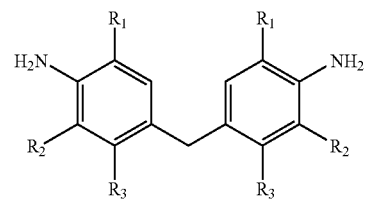

wherein $R_1$ and $R_2$ can each be independently chosen from methyl, ethyl, propyl, and isopropyl groups, and $R_3$ can be chosen from hydrogen and chlorine. Non-limiting examples of amine-containing curing agents for use in the present invention include the following compounds, manufactured by Lonza Ltd. (Basel, Switzerland):

LONZACURE.RTM. M-DIPA: $R_1$=$C_3H_7$; $R_2$=$C_3H_7$; $R_3$=H

LONZACURE.RTM. M-DMA: $R_1$=$CH_3$; $R_2$=$CH_3$; $R_3$=H

LONZACURE.RTM. M-MEA: $R_1$=$CH_3$; $R_2$=$C_2H_5$; $R_3$=H

LONZACURE.RTM. M-DEA: $R_1$=$C_2H_5$; $R_2$=$C_2H_5$; $R_3$=H

LONZACURE.RTM. M-MIPA: $R_1$=$CH_3$; $R_2$=$C_3H_7$; $R_3$=H

LONZACURE.RTM. M-CDEA: $R_1$=$C_2H_5$; $R_2$=$C_2H_5$; $R_3$=Cl wherein $R_1$, $R_2$ and $R_3$ correspond to the aforementioned chemical formula.

In a non-limiting embodiment, the amine-containing curing agent can include but is not limited to a diamine curing agent such as 4,4'-methylenebis(3-chloro-2,6-diethylaniline), (Lonzacure.RTM. M-CDEA), which is available in the United States from Air Products and Chemical, Inc. (Allentown, Pa.). In alternate non-limiting embodiments, the amine-containing curing agent for use in the present invention can include 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name Ethacure 100; dimethylthiotoluenediamine (DMTDA), which is commercially available from Albemarle Corporation under the trade name Ethacure 300; 4,4'-methylene-bis-(2-chloroaniline) which is commercially available from Kingyorker Chemicals under the trade name MOCA.

DETDA can be a liquid at room temperature with a viscosity of 156 cPs at 25° C. DETDA can be isomeric, with the 2,4-isomer range being from 75 to 81 percent while the 2,6-isomer range can be from 18 to 24 percent.

In a non-limiting embodiment, the color stabilized version of Ethacure 100 (i.e., formulation which contains an additive to reduce yellow color), which is available under the name Ethacure 100S may be used in the present invention.

In another embodiment, the amine-containing curing agent for use in the present invention can be chosen from DEDTA, compounds having the following structure

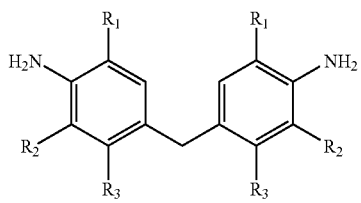

and mixtures thereof.

There are various known methods for preparing polyureaurethane. In a non-limiting embodiment, the polyureaurethane of the present invention can be prepared by one shot, quasi-prepolymer or full prepolymer methods, all of which are known in the art and disclosed in U.S. Pat. No. 5,962,617; which disclosure is herein incorporated by reference. In the one shot method, all of the reactants can be mixed together at one time. In the quasi-prepolymer method, generally 30 to 80 percent of the total amount of polyol is reacted with the polyisocyanate to form a prepolymer, and then the remaining 20 to 70 percent of the polyol can be added to the prepolymer with the amine-containing curing agent. In alternate non-limiting embodiments, a polyisocyanate (i.e., NCO) can be mixed with an OH-containing material in an equivalent ratio of from 2.0 to less than 2.5 NCO/1.0 OH, or from 2.1 to 2.4 NCO/1.0 OH, and heated to a temperature within the range of from 190° F. to 300° F. The period of time for heating the mixture can vary greatly. Generally, at lower temperatures the mixture can be heated for a longer period of time than can be employed at higher temperatures. For example, at a temperature of from 260 to 265° F., the mixture can be heated for 5 to 10 hours, and at a temperature of from 275 to 290° F., for a period of 3 to 5 hours. In a non-limiting embodiment, the mixture can be heated under dry nitrogen to facilitate the reaction of the polyisocyanate with the OH-containing material to form a prepolymer. The heat source can then be removed and the prepolymer can be cooled. In a further non-limiting embodiment, the prepolymer can be cooled to a temperature of 160° F. The prepolymer can be allowed to remain at that temperature for about 24 hours. The NCO present in the prepolymer then can be determined by a variety of methods known in the art such as ASTM-D-2572-91.

In a non-limiting embodiment of the present invention, the NCO present in the prepolymer can be determined as follows. A 2-gram sample of the polyureaurethane can be added to an Erlenmeyer flask. The sample can be purged with nitrogen and several glass beads (5 mm) then can be added. To this mixture can be added 20 mL of 1N dibutylamine (in toluene) with a pipet. The mixture can be swirled and capped. The flask then can be placed on a heating source and the flask can be heated to slight reflux, held for 15 minutes at this temperature and then cooled to room temperature. A piece of Teflon can be placed between the stopper and joint to prevent pressure buildup while heating. During the heating cycle, the contents can be frequently swirled in an attempt for complete solution and reaction. Blank values can be obtained and determined by the direct titration of 20 mL of pipeted 1N dibutylamine (DBA) plus 50 mL of methanol with 1N hydrochloric acid (HCl) using the Titrino 751 dynamic autotitrator. The average values for the HCl normalities and DBA blanks can be calculated, and the values can be programmed into the autotitrator. After the sample has cooled, the contents can be transferred into a beaker with approximately 50 to 60 mL of methanol. A magnetic stirring bar can be added and the sample can be titrated with 1N HCl using a preprogrammed Titrino 751 autotitrator. The percent NCO and IEW (isocyanate equivalent weight) can be calculated in accordance with the following formulas:

% NCO=(mLs blank−mLs sample)(Normality HCl) (4.2018)/sample wt., grams;

IEW=(sample wt., grams)1000/(mLs blank−mLs sample)(Normality HCl).

The "Normality HCl" value can be determined as follows. To a pre-weighed beaker can be added 0.4 grams of $Na_2CO_3$ primary standard and the weight can be recorded. To this can be added 50 mL of deionized water and the $Na_2CO_3$ can be dissolved with magnetic stirring. The Titrino 751 autotitrator can be used to titrate the primary standard with the 1N HCl and the volume can be recorded. This procedure can be repeated two additional times for a total of three titrations and the average can be used as the normality according to the following formula:

Normality HCl=standard wt., grams/(mLs HCl) (0.053).

In a non-limiting embodiment of the present invention, additional polyisocyanate can be added to the polyureaurethane prepolymer to achieve a different (e.g., higher or lower) equivalent weight of NCO/OH. The prepolymer can then be reacted at a temperature of from 70° F. to 300° F., with an amine-containing curing agent such as a diamine curing agent. In alternative non-limiting embodiments, the amine-containing curing agent can be present in an equivalent ratio of from 0.60 to 1.20 $NH_2$/1.0 NCO, or 0.90 to 1.0 $NH_2$/1.0 NCO, or 0.92 to 0.96 $NH_2$/1.0 NCO. The polyureaurethane can then be cured at a temperature of from 230 to 300° F. for a period of from 4 to 24 hours.

Suitable urethane-forming catalysts can be used in the present invention to enhance the reaction of the polyurethane-forming materials. Suitable urethane-forming catalysts can be those catalysts that are specific for the formation of urethane by reaction of the NCO and OH-containing materials, and which have little tendency to accelerate side reactions leading to allophonate and isocyanate formation. Non-limiting examples of suitable catalysts can be chosen from the group of Lewis bases, Lewis acids and insertion catalysts as described in Ullmann's Encyclopedia of Industrial Chemistry, 5th Edition, 1992, Volume A21, pp. 673 to 674. In a non-limiting embodiment, the catalyst can be a stannous salt of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, 1,4-diazabicyclo[2.2.2]octane, and mixtures thereof. In alternate non-limiting embodiments, the catalyst can be zinc octoate, bismuth, or ferric acetylacetonate.

Further non-limiting examples of suitable catalysts can include tertiary amines such as but not limited to triethylamine, triisopropylamine and N,N-dimethylbenzylamine. Such suitable tertiary amines are disclosed in U.S. Pat. No. 5,693,738 at column 10, lines 6–38, the disclosure of which is incorporated herein by reference.

In a non-limiting embodiment, the catalyst can be incorporated into the amine-containing curing agent. The amount of catalyst can vary widely depending on the particular catalyst chosen. In alternative non-limiting embodiments, the amount of catalyst can be less than 5% by weight, or less than 3% by weight, or less than 1% by weight, based on the total weight of the reaction mixture. For example, dibutyltin dilaurate can be employed in amounts of from 0.0005 to 0.02 parts per 100 parts of the polyurethane-forming materials. The amount of catalyst used can be dependent on the curing temperature employed.

In a non-limiting embodiment, the polyureaurethane of the present invention can have a viscosity of less than 2,000 cPs, or less than 1,500 cPs at 73° C. as measured using a Brookfield Viscosmeter. The viscosity of the prepolymer can be dependent on the particular polyisocyanate and OH-containing material chosen.

The polyureaurethane of this invention can be formed into an article by a variety of methods including but not limited to casting, compression molding, extruding or injection molding. In a non-limiting embodiment, the polyureaurethane can be cast into lenses. Casting of the polyureaurethane can produce a lens having good optical characteristics. In a non-limiting embodiment of the casting process, the polyureaurethane prepolymer and amine-containing curing agent mixture can be cast into a mold prior to curing. In a further non-limiting embodiment, the polyureaurethane of the invention can be partially cured, by choosing an appropriate curing time and temperature, and then the polyureaurethane can be removed from the casting molds and formed into a desired shape. The polyureaurethane can be formed into a simple or complex shape and can then be fully cured.

The polyether-containing polyureaurethane of this invention can be formed into an article by a variety of methods including but not limited to casting, compression molding, extruding or injection molding. In a non-limiting embodiment, the polyether-containing polyureaurethane can be cast into lenses. Casting of the polyether-containing polyureaurethane can produce a lens having good optical characteristics.

The lens can be coated on the front side and/or backside with an abrasion-resistant coating such as an organo-silane-type abrasion-resistant coating that is known in the art to protect plastic surfaces from abrasions and scratches. Organo-silane abrasion-resistant coatings can be referred to as hard coats and are known in the art. Various organo-silane hard coatings are disclosed in U.S. Pat. No. 4,756,973 at column 5, lines 1–45; and U.S. Pat. No. 5,462,806 at column 1, lines 58 through column 2, line 8 and column 3, line 52 through column 5, line 50, which disclosures are incorporated herein by reference. Further non-limiting examples of organo-silane hard coatings are disclosed in U.S. Pat. Nos. 4,731,264; 5,134,191; and 5,231,156 which disclosures are also incorporated herein by reference. In a non-limiting embodiment, the frontside and backside of the lens can be coated with SDC 1154 which is commercially available from SDC Coatings, Incorporated or HiGard 1080 which is commercially available from PPG Industries, Incorporated. In a non-limiting embodiment, front side and/or backside of the lens can be coated with an ultraviolet light curable hardcoat such as but not limited to UVX and UVNVS which are commercially available from UltraOptics.

Other coatings that provide abrasion and scratch resistance, such as polyfunctional acrylic hard coatings, melamine-based hard coatings, urethane-based hard coatings, alkyl-based coatings, silica sol-based hard coatings or other organic or inorganic/organic hybrid hard coatings can be used as the abrasion-resistant coating.

In a further non-limiting embodiment, additional coatings such as antireflective coatings can be applied to the hard coat layer. Examples of antireflective coatings are described in U.S. Pat. No. 6,175,450, the disclosure of which is incorporated herein by reference. In a non-limiting embodiment, the front side and/or backside of the lens can be coated with Essilor's Reflection Free anti-reflective coating which can be applied using Essilor's Reflection Free Process.

In a non-limiting embodiment, the front side of the lens can be coated with the SDC-1154 hard coat, the backside of the lens can be coated with the UVNVS hard coat, and then both the front side and the backside can be coated with Essilor's Reflection Free anti-reflective coating.

In general, the impact resistance of an uncoated lens can be higher than the impact resistance of a coated lens. The application of a hard coat to the lens can result in a decrease in the impact strength of the lens. The impact strength can be further decreased by the application of an antireflective coating onto the hard coated lens. The amount of decrease in the impact strength can be dependent on the particular hard and antireflective coatings selected for application to the lens.

The polyether-containing polyureaurethane of the present invention can have a good impact resistance. In alternate non-limiting embodiments, the polyether-containing polyureaurethane when at least partially cured and tested as a lens having a thickness of from 2.0 to 2.2 mm and having a hard coating on both surfaces, can withstand an impact of at least 148 feet per second, or at least 170 feet per second, or at least 300 feet per second, as measured by the High Impact Test Procedure. As used herein and the claims, the "High Impact Test Procedure" refers to the following procedure which is conducted in accordance with Z87.1-200X, Sep. 12, 2002, Committee Ballot Draft Revision of ANSI Z87.1-1989 (R1998), sections 7.5.2.1 "High Velocity Impact" and 14.3 "Test for High Impact Prescription Lenses". A Universal Lens Tester (ULT-II) as manufactured by International Certification Services Laboratories, Incorporated is used in the procedure. Plano power lenses having a maximum base curve of 6.25 can be edged round with an industrial safety bevel to a diameter of 55 mm +0.04 mm/−0.25 mm. Each lens can be tested once with a new lens being used for each additional impact. Each lens can be mounted in a test holder such that the test lens is held firmly against the bevel of the lens holder. The high velocity impact test includes propelling a missile at a velocity of 150 feet per second on the center of each lens. The missile consists of a 6.35 mm (0.25 inch) diameter steel ball (obtained from Applied Industrial Technologies) weighing 1.06 gram (0.037 ounce). The test can be repeated with two additional sample lenses. The lens can be considered to have failed the test if there is any posterior displacement of the lens completely through the test holder; any fracture of the lens; any detachment of a portion of the lens from its inner surface; or any full thickness penetration of a lens. As used herein, "fracture" refers to a crack through the entire thickness of the lens into two or more separate pieces, or detachment from the inner surface of any lens material visible to the naked eye. Failure of any one lens constitutes a failure.

In a non-limiting embodiment, small amounts of at least one tri-functional or higher functional polyol such as but not limited to a triol, tetrol, pentrol and mixtures thereof can be added to the polyether-containing polyureaurethane prepolymer in an amount sufficient to produce cross-linking based upon equivalents of reactants. In a further non-limiting embodiments, at least one of these materials is added to produce at least 0.01 percent, or at least 0.5 percent, or less than 99 percent, or less than 5 percent cross-linking by weight based on the total reactants. Suitable non-limiting examples include trimethylol propane, trimethylol ethane, glycerine, pentaerytheritol, dipentaerytheritol, sorbitol, sucrose, mannitol, and mixtures thereof. Further non-limiting examples include these materials chain extended with ethylene, propylene or butylenes oxide. The addition of at least one of these materials to the prepolymer can increase the heat distortion temperature and in some cases can improve the ballastic properties of the cured polyurethane.

In alternate non-limiting embodiments of the present invention, a variety of additives known in the art can be utilized in preparation of the polyureaurethane of the present invention. Non-limiting examples include various anti-oxidants, ultraviolet stabilizers, color blockers, optical brighteners, and mold release agents. In one non-limiting embodiment, at least one anti-oxidant can be added to the prepolymer in an amount of 5% or less by weight based on the total reactants. Suitable anti-oxidants that can be used in the present invention include but are not limited to those of the multifunctional hindered phenol type. One non-limiting example of a multifunctional hindered phenol type antioxidant can include Irganox 1010 which is commercially available from Ciba Geigy.

In alternative non-limiting embodiments, a UV-stabilizer can be added to the prepolymer, either prior to or during the curing step, in an amount of 5.0% or less by weight based on the total reactants, or from 0.5 to 4.0% by weight based on the total reactants. Suitable UV-stabilizers for use in the present invention include but are not limited to benzotriazoles. Non-limiting examples of benzotriazole UV-stabilizers include Cyasorb 5411, Cyasorb 3604, and Tinuvin 328. Cyasorb 5411 and 3604 are commercially available from American Cyanamid, and Tinuvin 328 is commercially available from Ciba Geigy.

In an alternative non-limiting embodiment, a hindered amine light stabilizer can be added to enhance UV protection. A non-limiting example of a hindered amine light stabilizer can include Tinuvin 765 which is commercially available from Ciba-Geigy.

The polyureaurethane of the present invention can be used in producing a photochromic article. United States Patent Applications having Ser. Nos. 09/793,886 and 09/794,026 both filed on Mar. 20, 2000 and pending in the United States Patent and Trademark Office, disclose the production of photochromic articles. These two applications are incorporated herein by reference.

When used to prepare photochromic articles, e.g., lenses, the polyureaurethane should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polyureaurethane of the present invention are organic photochromic compounds or substances containing same that may be incorporated, e.g., dissolved, dispersed or diffused into such polyureaurethane.

A first group of organic photochromic substances contemplated for use to form the photochromic articles of the present invention are those having an activated absorption maximum within the visible range of greater than 590 nanometers, e.g., from 590 to 700 nanometers. These materials typically exhibit a blue, bluish-green, or bluish-purple color when exposed to ultraviolet light in an appropriate solvent or matrix. Non-limiting examples of classes of such substances that are useful in the present invention include but are not limited to spiro(indoline)naphthoxazines and spiro(indoline)benzoxazines. These and other classes of such photochromic substances are known. See, for example, U.S. Pat. Nos. 3,562,172; 3,578,602; 4,215,010; 4,342,668; 5,405,958; 4,637,698; 4,931,219; 4,816,584; 4,880,667; 4,818,096.

A second group of organic photochromic substances contemplated for use to form the photochromic articles of the present invention are those having at least one absorption maximum and two absorption maxima, within the visible range of between 400 and less than 500 nanometers. These materials typically exhibit a yellow-orange color when exposed to ultraviolet light in an appropriate solvent or matrix. Such compounds include but are not limited to certain chromenes, i.e., benzopyrans and naphthopyrans. Many of such chromenes are known, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Non-limiting examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are described in U.S. Pat. No. 5,429,774.

Other photochromic substances contemplated include photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the afore-described patents are incorporated herein by reference. The photochromic articles of the present invention may contain one photochromic substance or a mixture of photochromic substances. Mixtures of photochromic substances may be used to attain certain activated colors such as a near neutral gray or brown.

Each of the photochromic substances described herein may be used in amounts and in a ratio (when mixtures are used) such that a polyurethane/polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into a polyurethane/polymerizate by various methods described in the art. Such methods include but are not limited to dissolving or dispersing the substance within the polyurethane/polymerizate, e.g., imbibition of the photochromic substance into the polyurethane/polymerizate by immersion of the polyurethane/polymerizate in a hot solution of the photochromic substance or by thermal transfer; providing the photochromic substance as a separate layer between adjacent layers of the polymerizate, e.g., as a part of a polymer film; and applying the photochromic substance as a coating or as part of a coating placed on the surface of the polyurethane/polymerizate. The term "imbibition" or "imbibe" is intended to mean and include permeation of the photochromic substance alone into the polyurethane/polymerizate, solvent assisted transfer absorption of the photochromic substance into a porous polymer, vapor phase transfer, and other such transfer mechanisms. One non-limiting example of an imbibing method includes the steps of coating the photochromic article with the photochromic substance; heating the surface of the photochromic article; and removing the residual coating from the surface of the photochromic article.

The amount of photochromic substance or composition containing the same applied to or incorporated into the polyurethane/polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polyurethane/polymerizate may range from 0.15 to 0.35 milligrams per square centimeter of surface to which the photochromic substance(s) is incorporated or applied.

It is also contemplated that photochromic substances can be added to the multi-component organic composition prior to polymerizing, e.g., cast curing, the composition. However, when this is done it is typical that the photochromic substance(s) be resistant to potentially adverse interactions with, for example, initiator(s) that may be present and/or the isocyanate, isothiocyante and amine groups of the first and second components. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polyurethane/polymerizate, as described in U.S. Pat. No. 4,931,220, can also be incorporated into the multi-component composition of the present invention prior to curing. If photochromic substances are added to the multi-component organic composition of the present invention prior to curing, they are typically incorporated into the second component prior to mixing the first and second components together.

EXAMPLES

In each of the following examples, the NCO concentration of Component A was determined using the following titrimetric procedure in accordance with ASTM-D-2572-91. The titrimetric method consisted of adding a 2 gram sample of Component A to an Erlenmeyer flask. This sample was purged with nitrogen and several glass beads (5 mm) were then added. To this mixture was added 20 mL of 1N dibutylamine (in toluene) with a pipet. The mixture was swirled and capped. The flask was then placed on a heating source and the flask was heated to slight reflux, held for 15 minutes at this temperature and then cooled to room temperature. Note, a piece of Teflon was placed between the stopper and joint to prevent pressure buildup while heating. During the heating cycle, the contents were frequently swirled in an attempt for complete solution and reaction. Blank values were obtained and determined by the direct titration of 20 mL of pipeted 1N dibutylamine (DBA) plus 50 mL of methanol with 1N hydrochloric acid (HCl) using the Titrino 751 dynamic autotitrator. Once the average values for the HCl normalities and DBA blanks were calculated, the values were programmed into the autotitrator. After the sample had cooled, the contents were transferred into a beaker with approximately 50–60 mL of methanol. A magnetic stirring bar was added and the sample titrated with 1N HCl using the preprogrammed Titrino 751 autotitrator. The percent NCO and IEW (isocyanate equivalent weight) were calculated automatically in accordance with the following formulas:

% NCO=(mLs blank−mLs sample)(Normality HCl)
(4.2018)/sample wt., grams

IEW=(sample wt., grams)1000/(mLs blank−mLs sample)(Normality HCl).

The "Normality HCl" value was determined as follows. To a pre-weighed beaker was added 0.4 grams of $Na_2CO_3$ primary standard and the weight was recorded. To this was added 50 mL of deionized water and the $Na_2CO_3$ was dissolved with magnetic stirring. An autotitrator (i.e., Metrohm GPD Titrino 751 dynamic autotitrator with 50 mL buret) equipped with a combination pH electrode (i.e., Metrohm combination glass electrode No. 6.0222.100), was used to titrate the primary standard with the 1N HCl and the volume was recorded. This procedure was repeated two additional times for a total of three titrations and the average was used as the normality according to the following formula:

Normality HCl=standard wt., grams/(mLs HCl)
(0.053).

Further, in each of the following examples, the following lens casting process was used to produce six semi-finished lenses from the Component A prepolymer. Component A and DETDA (referred to as Component B) were injected into a specially designed molding machine from Max Machinery. The DETDA was obtained from Albemarle Corporation. The molding machine was a Urethane Processor, Model No. 601-000-232, which was obtained from Max Machinery in Healdsburg, Calif. Components A and B were added to the machine and mixed with high shear for a short period of time. Component B and Component A were present in a molar ratio of 0.95 to 1.0. The blended mixture was then injected into lens molds. The molds were placed in a convection oven for six hours at a temperature of 130° C. The cast semi-finished lenses were then removed from the oven. The front side of the lens was coated with a commercial hard coat obtained from SDC Incorporated under the trade name of SDC 1154. The coating was applied by spinning the lens at 1100 rpm for 13 seconds using a spin coating device followed by a three-hour curing period at a temperature of 120° C. The lenses were then sent to 20/20 Optical Laboratory where the lenses were cut to a 55 mm diameter circle and surfaced to a plano power having a center thickness of 2.1 mm. The backside of each lens was hard coated with a commercial UV curable coating manufactured by UltraOptics under the tradename of UVNVS. These lenses were then sent to Essilor and were coated with Essilor's Reflection Free anti-reflective coating using Essilor's Reflection Free Process.

The cast lenses were than tested for impact strength by the High Impact Test Procedure. The "High Impact Test Procedure" refers to the following procedure which was conducted in accordance with Z87.1-200X, Sep. 12, 2002, Committee Ballot Draft Revision of ANSI Z87.1-1989 (R1998), sections 7.5.2.1 "High Velocity Impact" and 14.3 "Test for High Impact Prescription Lenses". A Universal Lens Tester (ULT-II) as manufactured by International Certification Services Laboratories, Incorporated wais used in the procedure. Plano power lenses having a maximum base curve of 6.25 were edged round with an industrial safety bevel to a diameter of 55 mm +0.04 mm/−0.25 mm. Each lens was tested once with a new lens being used for each additional impact. Each lens was mounted in a test holder such that the test lens was held firmly against the bevel of the lens holder. The high velocity impact test included propelling a missile at a velocity of 150 feet per second on the center of each lens. The missile consisted of a 6.35 mm (0.25 inch) steel ball weighing 1.06 gram (0.037 ounce). The lens was considered to have failed the test if there was any posterior displacement of the lens completely through the test holder; any fracture of the lens; any detachment of a portion of the lens from its inner surface; or any full thickness penetration of a lens. As used herein, "fracture" refers to a crack through the entire thickness of the lens into two or more separate pieces, or detachment from the inner surface of any lens material visible to the naked eye. Failure of any one lens constituted a failure.

Example 1

Preparation of a 2.0:1 NCO/OH Pre-Polymer

In a reaction vessel equipped with a paddle blade type stirrer, thermometer, gas inlet, and addition funnel, 4604 grams (35 equivalents of NCO) of Desmodur W[1] and 0.815 gram (0.0013 moles) of di-butyl Tin di-laurate were charged. The contents of the reactor were stirred at a rate of 150 rpm and a nitrogen blanket was applied as the reactor was slowly heated to a temperature of 65° C. While the reactor was heating, a polyol blend of 3276 grams (16.7 equivalents of OH) polyethylene glycol 400, and 270 grams (0.83 equivalents of OH) of an ethoxylated trimethylol propane (20 EO: 1 TMP) obtained from Aldrich, were mixed and charged to an addition funnel set to drip into the reaction vessel. The polyol blend was added from the funnel to the Desmodur W over a 2-hour period maintaining a temperature in the range of from 65° to 85° C. When the polyol addition was complete, the reaction mixture was maintained at a temperature of from 80° to 85° C. for 1 hour. A sample of the prepolymer was then obtained and analyzed for % NCO, according to the ASTM D-2572-91 method described in Example 1, and viscosity. The analytical result showed about 9.0% free NCO and a viscosity of 1500 cps at a temperature of 73° C. The viscosity measurement was made with a # 27 spindle at 20 RPM using a small sample holder DVII$_+$ Brookfield viscometer. The theoretical % NCO for this charge is approximately 9.0 thus indicating no unreacted OH groups. Before pouring out the contents of the reactor, 20.5 g of Irganox 1010 (obtained from Ciba Specialty Chemicals), a thermal stabilizer, was mixed into the prepolymer.

Example 2

Preparation of a 2.2:1 NCO/OH Pre-Polymer

The reactor vessel set-up, addition of polyol, reaction temperature range, % NCO analysis and viscosity measurement were conducted as described in Example 2. The charge weights used for this example were 4795 grams (36.5 equivalents of NCO) Desmodur W, 3100 grams (15.8 equivalents of OH) polyethylene glycol 400, and 256 grams (0.79 equivalents of OH) ethoxylated trimethylol propane (20 EO: 1 TMP). The pre-polymer was reacted to an analyzed free % NCO content of 10.2 and a viscosity of 1058 @ 73° C. # 27 spindle @ 20 RPM. Theoretical free % NCO is 10.2. Before pouring out the contents of the reactor, 20.5 g of Irganox 1010 (obtained from Ciba Specialty Chemicals), a thermal stabilizer, was mixed into the prepolymer.

Example 3

Preparation of a 2.4:1 NCO/OH Pre-Polymer

The reactor vessel set-up, addition of polyol, reaction temperature range, % NCO analysis and viscosity measurement were conducted as described in Example 2. The charge weights used for this example were 4965 grams (37.8 equivalents of NCO) Desmodur W, 2943 grams (15.0 equivalents of OH) polyethylene glycol 400, and 243 grams (0.75 equivalents OH) ethoxylated trimethylol propane (20 EO: 1 TMP). The pre-polymer was reacted to an analyzed free % NCO content of 11.4 and a viscosity of 650 @ 73° C. # 27 spindle @ 20 RPM. Theoretical free % NCO is 11.4. Before pouring out the contents of the reactor, 20.5 g of Irganox 1010 (obtained from Ciba Specialty Chemicals), a thermal stabilizer, was mixed into the pre-polymer.

Example 4

Preparation of a 2.6:1 NCO/OH Pre-Polymer

The reactor vessel set-up, addition of polyol, reaction temperature range, % NCO analysis and viscosity measurement were conducted as described in Example 2. The charge weights used for this example were 5026 grams (38.3 equivalents of NCO) Desmodur W, 2746 grams (14.0 equivalents of OH) polyethylene glycol 400, and 227 grams (0.70 equivalents of OH) ethoxylated trimethylol propane (20 EO: 1 TMP). The pre-polymer was reacted to an analyzed free % NCO content of 12.3 and a viscosity of 650 @ 73° C. # 27 spindle @ 20 RPM. Theoretical free % NCO is 12.4. Before pouring out the contents of the reactor, 20.5 g of Irganox 1010 (obtained from Ciba Specialty Chemicals), a thermal stabilizer, was mixed into the pre-polymer.

The following is a summary of the highest velocity in which each series of lenses passed the impact test.

| Pre-polymer Sample No. | NCO/OH | Ft/sec. passed | % Free NCO | Viscosity @ 73° C. |
|---|---|---|---|---|
| Example 1 | 2.0 | 235 | 9.0 | 1500 |
| Example 2 | 2.2 | 185 | 10.2 | 1058 |
| Example 3 | 2.4 | 159 | 11.4 | 650 |
| Example 4 | 2.6 | 151 | 12.3 | 450 |

[1]The Desmodur W was obtained from Bayer Corporation and represents 4,4'-methylenebis(cyclohexyl isocyanate) containing 15–20% of the trans-, trans isomer and the remainder of the cis-cis and cis-trans isomers.

Example 5

In a reaction vessel equipped with a paddle blade type stirrer, thermometer, gas inlet, and addition funnel, 4060 grams (30.93 equivalents of NCO) of Desmodur W obtained from Bayer Corporation, 2821 grams (14.0 equivalents of OH) of a 400 MW polycaprolactone diol (CAPA 2047A obtained from Solvay), and 234 grams (0.72 equivalents of OH) of an ethoxylated trimethylol propane (20 EO: 1 TMP) obtained from Aldrich were charged. The contents of the reactor were stirred at a rate of 150 rpm and a nitrogen blanket was applied as the reactor contents were heated to a temperature of 120° C. at which time the reaction mixture began to exotherm. The heat was removed and the temperature rose to a peak of 140° C. for 30 minutes then began to cool. Heat was applied to the reactor when the temperature reached 120° C. and was maintained at that temperature for 4 hours. The reaction mixture was sampled and analyzed for % NCO, according to the method described above. The analytical result showed 9.5% free NCO and a viscosity of 2750 cps at a temperature of 73° C. The viscosity measurement was made with a # 27 spindle at 20 RPM using a small sample holder DVII+ Brookfield viscometer. The theoretical % NCO for this charge was 9.6 which indicated no unreacted OH groups. Before pouring out the contents of the reactor, 17.8 g of Irganox 1010 (obtained from Ciba Specialty Chemicals), a thermal stabilizer, was mixed into the pre-polymer.

Example 6

In a reaction vessel equipped with a paddle blade type stirrer, thermometer, gas inlet, and addition funnel, 4464 grams (34.01 equivalents of NCO) of Desmodur W obtained from Bayer Corporation, 2418 grams (12.0 equivalents of OH) of a 400 MW polycaprolactone diol (CAPA 2047A obtained from Solvay), and 201 grams (0.72 equivalents of OH) of an ethoxylated trimethylol propane (20 EO: 1 TMP) obtained from Aldrich were charged. The contents of the reactor were stirred at a rate of 150 rpm and a nitrogen blanket was applied as the reactor contents were heated to a temperature of 120° C. at which time the reaction mixture began to exotherm. The heat was removed and the temperature rose to a peak of 135° C. for 30 minutes then began to cool. Heat was applied to the reactor when the temperature reached 120° C. and was maintained at that temperature for 4 hours. The reaction mixture was sampled and analyzed for % NCO, according to the method described above. The analytical result showed 12.6% free NCO and a viscosity of 840 cps at a temperature of 73° C. The viscosity measurement was made with a # 27 spindle at 20 RPM using a small sample holder DVII+ Brookfield viscometer. The theoretical % NCO for this charge was 12.7 which indicated no unreacted OH groups. Before pouring out the contents of the reactor, 17.7 g of Irganox 1010 (obtained from Ciba Specialty Chemicals), a thermal stabilizer, was mixed into the pre-polymer.

| Pre-polymer Sample No. | NCO/OH | Ft/sec. passed | % Free NCO | Viscosity @ 73° C. |
|---|---|---|---|---|
| Example 5 | 2.1 | 158 | 9.5 | 2750 |
| Example 6 | 2.7 | 143 | 12.6 | 840 |

In the claims:

1. A non-elastomeric polyureaurethane comprising the reaction product of:
   a. a polyureaurethane prepolymer comprising a polyisocyanate and at least one OH-containing material, said prepolymer having a NCO/OH equivalent ratio of from 2.0 to 2.4; and
   b. an amine-containing curing agent.

2. The polyureaurethane of claim 1 wherein said polyisocyanate is chosen from aliphatic polyisocyanates, cycloaliphatic polyisocyanates, aromatic polyisocyanates, and mixtures thereof.

3. The polyureaurethane of claim 2 wherein said polyisocyanate is chosen from aliphatic diisocyanates, cycloaliphatic diisocyanates, aromatic diisocyanates, cyclic dimers and cyclic trimers thereof, and mixtures thereof.

4. The polyureaurethane of claim 3 wherein said polyisocyanate is chosen from dicyclohexylmethane diisocyanate and isomeric mixtures thereof.

5. The polyureaurethane of claim 4 wherein said polyisocyanate is chosen from trans, trans isomer of 4,4'-methylenebis(cyclohexyl isocyanate).

6. The polyureaurethane of claim 3 wherein said polyisocyanate is chosen from 3-isocyanato-methyl-3,5,5-trimethyl cyclohexyl-isoxyanate; meta-tetramethylxylene diisocyanate (1,3-bis(1-isocyanato-1-methylethyl)-benzene) and mixtures thereof.

7. The polyureaurethane of claim 1 wherein said OH-containing material is chosen from polyester polyols, polycaprolactone polycols, polyether polycols, polycarbonate polyols, and mixtures thereof.

8. The polyureaurethane of claim 7 wherein said OH-containing material has a weight average molecular weight of from 200 to 32,000.

9. The polyureaurethane of claim 8 wherein said OH-containing material has a weight average molecular weight of from 2,000 to 15,000.

10. The polyureaurethane of claim 1 wherein said OH-containing material comprises a block polymer chosen from blocks of ethylene oxide-propylene oxide and ethylene oxide-butylene oxide.

11. The polyureaurethane of claim 1 wherein said OH-containing material comprises a polyol of the following formula:

$$H-(O-CRRCRR-Y_n)_a-(CRRCRR-Y_n-O)_b-(CRRCRR-Y_n-O)_c-H$$

wherein R can represent hydrogen or $C_1$–$C_6$ alkyl; Y can represent $CH_2$; n can be an integer from 0 to 6; a, b, and c can each be an integer from 0 to 300, wherein a, b and c are chosen such that the weight average molecular weight of the polyol does not exceed 32,000.

12. The polyureaurethane of claim 1 wherein said amine-containing curing agent is chosen from materials having the following chemical formula and mixtures thereof:

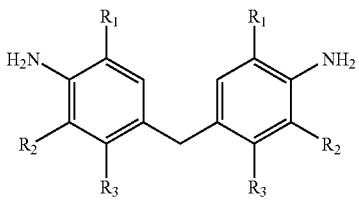

wherein $R_1$ and $R_2$ are each independently chosen from methyl, ethyl, propyl, and isopropyl groups, and $R_3$ is chosen from hydrogen and chlorine.

13. The polyureaurethane of claim 1 wherein said amine-containing curing agent is 4,4'-methylenebis(3-chloro-2,6-diethylaniline).

14. The polyureaurethane of claim 1 wherein said amine-containing curing agent is chosen from 2,4-diamino-3,5-diethyl-toluene; 2,6-diamino-3,5-diethyl-toluene and mixtures thereof.

15. The polyureaurethane of claim 1 wherein said amine-containing curing agent has a $NCO/NH_2$ equivalent ratio of from 1.0 $NCO/0.60$ $NH_2$ to 1.0 $NCO/1.20$ $NH_2$.

16. A method of preparing a non-elastomeric polyureaurethane comprising the steps of:
    a. reacting a polyisocyanate with at least one OH-containing material to form a polyureaurethane prepolymer having a NCO/OH equivalent ratio of from 2.0 to 2.4; and
    b. reacting said polyurethane prepolymer with an amine-containing curing agent to form said polyureaurethane.

17. The method of claim 16 wherein said polyisocyanate is chosen from aliphatic polyisocyanates, cycloaliphatic polyisocyanates, aromatic polyisocyanates, and mixtures thereof.

18. The method of claim 17 wherein said polyisocyanate is chosen from aliphatic diisocyanates, cycloaliphatic diisocyanates, aromatic diisocyanates, cyclic dimers and cyclic trimers thereof, and mixtures thereof.

19. The method of claim 18 wherein said polyisocyanate is chosen from dicyclohexylmethane diisocyanate and isomeric mixtures thereof.

20. The method of claim 19 wherein said polyisocyanate is chosen from trans, trans isomer of 4,4'-methylenebis (cyclohexyl isocyanate).

21. The method of claim 18 wherein said polyisocyanate is chosen from 3-isocyanato-methyl-3,5,5-trimethyl cyclohexyl-isocyanate; meta-tetramethylxylene diisocyanate(1,3-bis(1-isocyanato-1-methylethyl)-benzene) and mixtures thereof.

22. The method of claim 16 wherein said OH-containing material is chosen from polyester polyols, polycaprolactone polyols, polyether polyols, polycarbonate polyols, and mixtures thereof.

23. The method of claim 22 wherein said OH-containing material has a weight average molecular weight of from 200 to 32,000.

24. The method of claim 23 wherein said OH-containing material has a weight average molecular weight of from 2,000 to 15,000.

25. The method of claim 16 wherein said OH-containing material comprises a block polymer chosen from blocks of ethylene oxide-propylene oxide and ethylene oxide-butylene oxide.

26. The method of claim 16 wherein said OH-containing material comprises a polyol of the following formula:

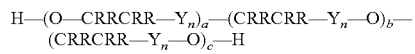

wherein R can represent hydrogen or $C_1$–$C_6$ alkyl; Y can represent $CH_2$; n can be an integer from 0 to 6; a, b, and c can each be an integer from 0 to 300, wherein a, b and c are chosen such that the weight average molecular weight of the polyol does not exceed 32,000.

27. The method of claim 16 wherein said amine-containing curing agent is chosen from materials having the following chemical formula and mixtures thereof:

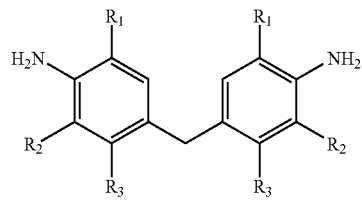

wherein $R_1$ and $R_2$ are each independently chosen from methyl, ethyl, propyl, and isopropyl groups, and $R_3$ is chosen from hydrogen and chlorine.

28. The method of claim 16 wherein said amine-containing curing agent is 4,4'-methylenebis(3-chloro-2,6-diethylaniline).

29. The method of claim 16 wherein said amine-containing curing agent is chosen from 2,4-diamino-3,5-diethyl-toluene; 2,6-diamino-3,5-diethyl-toluene and mixtures thereof.

30. The method of claim 16 wherein said amine-containing curing agent has a $NCO/NH_2$ equivalent ratio of from 1.0 $NCO/0.60$ $NH_2$ to 1.0 $NCO/1.20$ $NH_2$.

31. An optical article comprising a non-elastomeric polyureaurethane comprising the reaction product of:
    a. a polyureaurethane prepolymer comprising a polyisocyanate and at least one OH-containing material, said prepolymer having a NCO/OH equivalent ratio of from 2.0 to 2.4; and
    b. an amine-containing curing agent.

32. The optical article of claim 31 wherein said OH-containing material comprises a block polymer chosen from blocks of ethylene oxide-propylene oxide and ethylene oxide-butylene oxide.

33. The non-elastomeric polyureaurethane of claim 1 wherein the polyureaurethane prepolymer further comprises a viscosity of less than 2,000 cPs at 73° C.

34. The non-elastomeric polyureaurethane of claim 1, wherein the NCO/OH equivalent ratio ranges from 2.1 to 2.4.

* * * * *